Oct. 16, 1956     H. E. SHOBE     2,767,133

FRACTIONATION PROCESS AND APPARATUS

Filed June 13, 1955

INVENTOR.
H. E. SHOBE

BY Hudson & Young
ATTORNEYS

United States Patent Office 2,767,133
Patented Oct. 16, 1956

2,767,133

FRACTIONATION PROCESS AND APPARATUS

Henry E. Shobe, Bartlesville, Okla., assignor to Phillips Petroleum Company, a corporation of Delaware Application June 13, 1955, Serial No. 515,100

9 Claims. (Cl. 202—40)

This invention relates to a fractionation system, and a method of fractionating streams containing a plurality of components.

In the operation of fractionation columns, feed to be separated into a high boiling fraction and a low boiling fraction is fed to a column which is heated at the bottom and cooled at the top with resulting separation of the feed into a heavy or kettle product and a light or overhead product. In the fractionation column, repeated vaporization and condensation of the feed takes place and, at each level in the column, the material has a definite composition which is related to the temperature at that point, the temperature, of course, decreasing as the top of the column is approached, and the composition becoming progressively denuded of the heavier materials.

When a fractionation column is operated to produce a maximum degree of separation, as much heat as possible is applied to the column for satisfactory operation which in turn requires a certain amount of reflux in order to divide the feed into a given ratio of kettle product and overhead product. In order to obtain the maximum degree of separation, the feed to the column should be heated as near to the bubble point on the feed tray as possible and the additional heat added in the kettle of the fractionator. When operating in this manner, the column operates under maximum vapor load; that is, if the vapor load is increased, the column will flood. By operating the column to obtain the maximum degree of separation, the vapor load above the feed tray and below the feed tray is maintained at maximum column capacity. If the feed is fed to the column above the bubble point, then it is necessary to add less heat to the kettle and, therefore, the vapor load below the feed tray will be less than maximum column capacity. If the feed is fed to the column below the bubble point on the feed tray, it is necessary to increase the rate of addition of heat to the kettle and, therefore, the part of the column below the feed tray will operate at maximum vapor load and the part of the column above the feed tray will operate below maximum column vapor capacity. Therefore, it can be seen that to obtain the maximum degree of separation when operating a fractionation column, the feed should be fed to the column at its bubble point within the column, regardless of the feed rate and composition, and the rate of addition of heat to the kettle should be maintained great enough that the column operates under maximum vapor capacity. It can be further stated that the maximum degree of separation could be more nearly obtained if the feed to a fractionating column were heated to the bubble point of the feed on the feed tray at all times.

If the feed preheater or kettle heater are of undercapacity then it may be desirable to either heat the feed above the bubble point or add more heat than usual to the kettle. The bubble point, as defined herein, means the temperature at which the vaporization of the material is incipient, that is, a temperature where some bubbles form but there is no substantial evolution of vapor. Thus, if the feed enters the column above the bubble point, vapors are admixed therewith and these vapors must be recondensed in the column before proper separation can be effected. Further, in many instances, particularly where the column is operated at full capacity, the downcomer of the feed introduction tray is of just sufficient size to handle the required liquid flow therethrough, and presence of substantial quantities of vapors in the feed substantially interferes with the operation of this downcomer unit especially if the feed enters directly over a downcomer. Conversely, if the vapors enter substantially below the bubble point, the feed must be heated appreciably within the column before vaporization will commence, thus again decreasing the efficiency of the fractionation operation. Thus, for most efficient operation of a fractionation column at maximum throughput, the feed should be introduced at its bubble point.

Heretofore, fractionators have ordinarily been operated to maintain a predetermined feed temperature, for example, the bubble point of a feed mixture of assumed composition at the column pressure. It will be evident that slight changes in the feed composition, particularly of the lighter components thereof, will change the bubble point so that, whenever the feed composition is different from its assumed composition, the column is not operated at maximum efficiency. In particular, where the column is operated at high throughput, such variations in feed compositions can cause serious upsets in column operation resulting, for example, in excessive entrainment of liquid in the ascending vapors.

In accordance with this invention, the temperature of the feed is not preset but, rather, it is automatically regulated so that the feed enters the column at its bubble point despite variations in feed composition. This is effected by providing a control vessel into which a portion of the feed stream is introduced, the liquid in the control vessel being connected through a line of low flow resistance to the fractionation column adjacent the feed inlet, and the vapor space being connected through a restricted passage to a low pressure region of the column. Since vapors are continuously withdrawn from the control vessel, the material therein is maintained at its boiling point, and the feed is maintained at a fixed temperature with respect to the boiling point within the column. Advantageously, this fixed temperature can be the bubble point on the feed tray which is ordinarily one or two degrees below the boiling point. This is done by maintaining a fixed liquid level within the control vessel, as by variation of the heat input to a feed preheater through a liquid level controller connected to the control vessel.

With the material in the control vessel at its boiling point and a constant difference being maintained between the liquid level in the control vessel and the liquid level on the feed tray, it will be apparent that the relation of the feed temperature to the boiling point of the feed within the column is controlled by this difference in level, which is a measure of the vapor pressure difference between the control vessel (where the feed is boiling) and the vapor pressure at the feed tray. In particular, if the level in the control vessel is maintained slightly above the liquid level on the feed tray, the feed enters at the bubble point, i. e., one or two degrees below the boiling point at column pressure because the column pressure is slightly higher than the pressure in the control vessel. If the level is substantially higher in the control vessel, the pressure at the feed tray is substantially greater than the vapor pressure in the control vessel so that the feed enters at a temperature a constant number of degrees below its boiling point or bubble point within the column.

Conversely, if the liquid level in the control vessel is below the liquid level on the feed tray, the pressure in the feed region of the column is lower than the pressure in the control vessel so that the feed enters at a temperature above its boiling point or bubble point within the column. Thus, according to the present invention, the feed enters the column at a temperature of "X" degrees from its boiling point at column pressure despite changes in feed composition, it being understood that "X" can be a positive or negative number or zero, and that "X" remains constant for any given setting of the liquid level.

Although, as previously noted, the most advantageous operation is obtained where the feed enters the column at the bubble point, in some cases, it is desirable that the feed enter at a fixed predetermined number of degrees above or below the bubble point. For example, if the kettle heater has a small capacity, it is desirable to operate with the feed at a temperature above the bubble point or, if it is desired to cut down the reflux rate, it is desirable that the feed enter at a temperature below the bubble point. However, in either case, to prevent column upsets, if the bubble point of the feed changes due to a change in composition, the preset temperature should change in a corresponding manner so that the feed is maintained at "X" degrees from the bubble point. This result is accomplished by the control system of the invention.

Accordingly, it is an object of the invention to provide an improved fractionation system.

It is a further object to provide an improved fractionation process.

It is a still further object to provide a system wherein the feed is introduced at its bubble point, or at a temperature a predetermined number of degrees above or below the bubble point, despite changes in feed composition.

It is a further object to provide a system wherein a fractionation column produces a maximum degree of separation by operating the column at its maximum vapor load at all times, and with the feed entering the column at its bubble point on the feed tray.

It is a still further object to accomplish the foregoing purposes in a simple and reliable manner, with a minimum expenditure for the necessary control apparatus.

Various other objects, advantages and features of the invention will become apparent from the following detailed description taken in conjunction with the accompanying drawings, in which.

Figure 1:
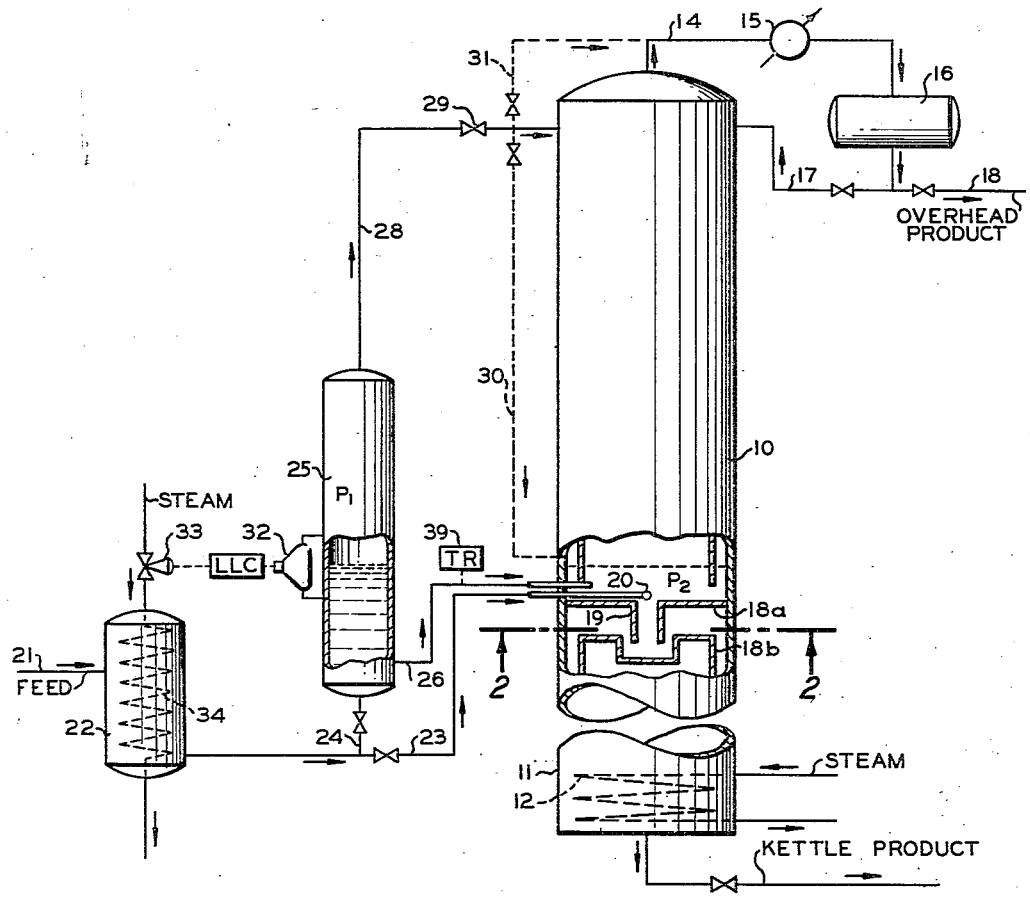
Figure 1 is a flow diagram of a fractionation system constructed in accordance with the invention.

Referring now to Figure 1, I have shown a fractionation column 10 having a heater 11 at the bottom thereof which, in the example shown, is a coil 12 through which steam is circulated. A reboiler or any other suitable means of supplying heat to the bottom of the column can be used. The bottom or kettle product is withdrawn through a valved line 13. Overhead product is withdrawn through a system including a line 14, a cooler or condenser 15 and an overhead accumulator 16. Part of the product is discharged from the accumulator and passes through a valved line 17 to the top of the column as reflux material while the remainder is withdrawn through a valved product line 18.

Figure 2:
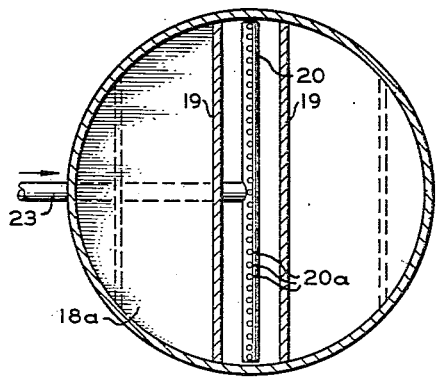
Figure 2 is a horizontal sectional view of the arrangement of downcomer and feed inlet.

Preferably but not necessarily, the column includes a number of trays 18a, 18b certain of the trays 18a being provided with a central downcomer 19, Figures 1 and 2, and feed is introduced through a line 20 which extends diametrically of the column and is provided with perforations 20a so that the feed is discharged downwardly and distributed along the cross sectional area of the downcomer. When the column is operated under full load conditions, the downcomer is substantially liquid full and, as previously noted, presence of the vapor in the feed can cause overloading of the downcomer under these conditions.

The feed is introduced to the column through a line 21 which passes through a preheater 22, and a valved conduit 23 to the feed distributor line 20. The conduit 23 is of large cross section relative to a bypass line or conduit 24 through which a small part of the feed passes to a control vessel 25. As shown, the vessel 25 is separate from the column but, in some instances, the vessel 25 can be merely an enlargement in the feed pipe or in a line bypassing a part of the feed pipe as will become apparent from the following description.

A liquid level is maintained in the control vessel 25, and a line 26, which offers low resistance to the flow of the liquid therethrough, particularly as compared to line 24, connects the bottom part of the vessel 25 to a portion of the column closely adjacent the inlet 20. The top or vapor space of the vessel 25 is connected by a line 28, which has a flow resisting valve or orifice 29 therein, to a portion of the column 10 above the feed region 18a. As shown, the line 28 is connected near the top of the column but, in some instances, it can be connected to a tray just above the feed entry, as indicated by dotted line 30 or, alternatively, to the overhead line 14, as indicated by dotted line 31.

A liquid level controller 32 has a sensing element disposed within the vessel 25, and is operatively connected to a valve 33 which controls the flow of steam or other heating medium through a coil 34 in the preheater 22.

In operation, during the initial period, it can be assumed that vessel 25 is liquid-full. Under these conditions, controller 32 opens valve 33 to pass a large quantity of steam to the coil 34. This heats the feed and, hence, also the material passing through the control vessel 25. Eventually, vapors of the liquid in the control vessel build up pressure therein so that the liquid is forced downwardly to a predetermined position established by the setting of controller 32, and valve 33 is automatically regulated to maintain the level at this point through control of valve 33. Thus, if the level drops, less steam is fed through the preheater so that less material vaporizes in vessel 25 and the liquid level rises to the control point whereas, if the liquid level rises above the control point, the amount of steam is increased with resultant increase in temperature of the feed and vapor pressure within vessel 25, whereby the liquid level in the vessel is lowered.

The valve or throttling device 29 is so adjusted that a very small amount of vapor flows continuously through the line 28. As a result, the liquid in vessel 25 is continuously maintained at its boiling point, any changes in composition causing the operation of liquid level controller 32 and steam valve 33 so as to make the necessary increase or decrease in temperature to maintain the liquid level boiling conditions within the vessel.

Figure 3:
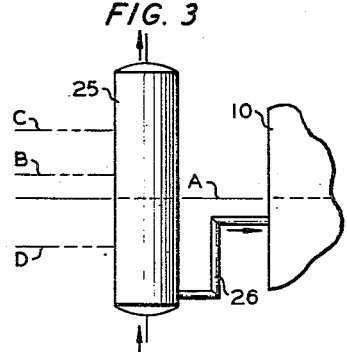
Figure 3 is a detailed view illustrating a feature of the invention.

It will be noted that the difference between the pressure P1 in the control vessel 25 and the pressure P2 existing at the feed tray of the fractionator is equal to the difference in level between the liquid in vessel 25 and the liquid on the feed tray 18a. Referring now to Figure 3, the line A represents the level on the feed tray of the fractionator and, assuming that this level is equal to the liquid level in vessel 25, it will be evident that the feed enters the column at its boiling point because, in this instance, the pressures P1, P2 are equal as are the liquid temperatures. Thus, since the liquid is boiling in vessel 25, it is at its boiling point in the column 10.

Next, assuming that controller 32 is set to maintain a level B, Figure 3, in the vessel 25 which is slightly higher than the level in column 10, then the pressure in the column is slightly greater than the pressure in vessel 25. Since the liquid is boiling in vessel 25, it will be evident that, due to the slightly increased pressure, it is below its boiling point as it enters the fractionator 10. Where the difference in boiling point within the column and the boiling point in the vessel is very small, say 1° F., the feed enters the column at a temperature slightly below its boiling point, i. e., at its bubble point.

It will be evident that, if it is desired to operate at a still lower temperature compared to the boiling point within the column, that is, a temperature several degrees below the boiling point or bubble point within the column, the level in vessel 25 can be raised to that indicated by line C whereas, if the level is dropped to line D, the feed will enter the column above its boiling point. In the latter instance, the vapor pressure in the column 10 is lower than the vapor pressure in vessel 25 by an amount represented by the liquid head between lines A and D. Since the liquid is boiling in the vessel 25, and enters the column 10 at the same temperature as that existing in vessel 25, it will boil more vigorously in the column 10 due to the reduced pressure. That is, in actuality, it will enter the column 10 at a temperature above the boiling point at column pressure.

It will be noted that the aforedescribed control action is independent of the composition of the feed because the difference between the feed temperature and its boiling point is determined solely by the difference between the pressures P1 and P2, i. e., the difference in liquid level in the vessel 25 and feed tray 18a, which is not dependent upon the feed composition. If the pipe enters the column 10 in the vapor space above the feed tray, the operation is the same, the difference between the pressures P1 and P2 being determined by the difference in level between the liquid in vessel 12 and the level at which line 26 enters the column.

A temperature recorder 39 can be provided at line 26, and this temperature control unit will indicate the feed composition due to the fact that the feed temperature varies in accordance with composition so that it stays a fixed number of degrees away from the boiling point, advantageously at the bubble point within the column.

It will be noted that the liquid in vessel 25 is not maintained precisely at its boiling point due to the flow through line 28. However, as a practical matter, this flow can be made so small that its effect upon the boiling point of the liquid can be disregarded so that the control action is not disturbed by this small flow. Moreover, if the pressure difference between the region where line 28 enters the column in the feed tray is appreciable, calibration of the system may be required. However, since the pressure drop remains constant even when there are changes in composition of the feed, once calibrated, the accuracy of control action is maintained with differing feed compositions. The effect of the pressure difference can be minimized by placing the line 28 closer to the feed tray, but it must, of course, be sufficiently far from the feed tray to provide sufficient pressure drop to operate the control system.

In one specific example, the apparatus is used in the separation of a $C_4$ to $C_8$ hydrocarbon stream. The compositions of the feed, overhead product and kettle product are as follows:

*Table I*

| Component | Feed | | Overhead Product | | Kettle Product | |
|---|---|---|---|---|---|---|
| | Gallons Per Day | Mol Per-cent | Gallons Per Day | Mol Per-cent | Gallons Per Day | Mol Per-cent |
| Normal butane | 11,050 | 2.10 | 11,050 | 3.32 | | |
| Isopentanes | 176,800 | 29.02 | 176,400 | 45.70 | 400 | .18 |
| Normal pentanes | 204,100 | 33.82 | 194,100 | 50.76 | 10,000 | 4.52 |
| Normal hexanes | 139,750 | 20.39 | 1,000 | .22 | 138,750 | 55.27 |
| Normal heptanes | 61,750 | 8.03 | | | 61,750 | 21.93 |
| Normal octanes | 56,550 | 6.64 | | | 56,550 | 18.10 |

The reflux rate is 611,450 gallons per day at 186° F., the top of the column operating at 186° F. and 65 pounds per square inch absolute, and the kettle operating at 288° F. and 70 pounds per square inch absolute. Feed enters the preheater at the temperature of 80–90° F. and arrives at the column at its bubble point temperature of 211° F., the liquid level in the vessel 25 being about 3" above the liquid level at the feed tray 18a, and column pressure at the feed heater being 67 pounds per square inch absolute. Small variations in the composition of the feed cause changes in the bubble point, and the feed preheater is automatically adjusted to maintain the feed at its bubble point despite these changes in composition. As the composition of the feed changes, as indicated in the following table, the composition of the overhead and kettle products are as follows:

*Table II*

| Component | Feed | | Overhead Product | | Kettle Product | |
|---|---|---|---|---|---|---|
| | Gallons Per Day | Mol Per-cent | Gallons Per Day | Mol Per-cent | Gallons Per Day | Mol Per-cent |
| Normal butane | 53,240 | 10.00 | 53,240 | 14.98 | | |
| Isopentanes | 165,170 | 26.68 | 164,770 | 40.26 | 400 | .19 |
| Normal pentanes | 190,580 | 31.09 | 180,580 | 44.54 | 10,000 | 4.83 |
| Normal hexanes | 130,520 | 18.75 | 1,000 | .22 | 129,520 | 55.08 |
| Normal heptanes | 57,650 | 7.38 | | | 57,650 | 21.85 |
| Normal octanes | 52,840 | 6.10 | | | 52,840 | 18.05 |

With a feed of this composition, the flow of steam through the preheater is reduced so that the feed enters at its bubble point temperature within the column of 199° F., the overhead temperature dropping to 180° F. and the pressure P2 remaining at 67 pounds per square inch absolute.

It will be apparent from the foregoing that I have provided a system for introducing the feed to a fractionation column at its bubble point or at a temperature removed a predetermined number of degrees from its bubble or boiling point despite substantial changes in the composition of the feed. This permits efficient operation of the fractionator under full load conditions without upsets in operation of the column. By the practice of this invention the column is operated under conditions of practically full vapor load and much closer to this condition than is possible when a preset feed temperature is maintained. Moreover, the column can be fully loaded without overloading the feed downcomer, it being understood that such overloading would result in undercapacity operation if substantial quantities of vapor were evolved from the feed.

While the invention has been described in connection with a present, preferred embodiment thereof, it is to be understood that this description is illustrative only and is not intended to limit the invention.

I claim:

1. In a fractionation process, the steps which comprise heating a feed stream to be fractionated, introducing the major portion of the heated feed stream into a fractionation zone and therein separating it into a kettle product and an overhead product, introducing the remaining small part of the feed stream into a control vessel wherein a liquid level is maintained, passing liquid from said vessel into said fractionation zone at a region closely adjacent the region of feed introduction, continuously withdrawing vapor from said control vessel into a low pressure region of said fractionation zone, establishing a liquid level in said control vessel at a height determined by the vapor pressure difference between the control vessel and the feed introduction region of the fractionation zone, decreasing the heat supplied in said heating step when said liquid level falls below its established value and increasing the heat supplied when said liquid level rises above its established value, whereby the feed entering said fractionation zone is maintained at a predetermined temperature with respect to its bubble point at the pressure prevailing at said region of feed introduction.

2. In a fractionation process, the steps which comprise heating a feed stream to be fractionated, introducing the major portion of the heated feed stream into a fractionation zone and therein separating it into a kettle product and an overhead product, introducing the remaining small part of the feed stream into a control vessel wherein a liquid level is maintained, passing liquid from said vessel into said fractionation zone at a region closely adjacent the region of feed introduction, continuously withdrawing vapor from said control vessel into a low pressure region of said fractionation zone, establishing a liquid level in said control vessel at a predetermined height determined by the vapor pressure difference between the control vessel and the feed introduction region of the fractionation zone, and regulating the amount of heat supplied in said heating step to maintain said liquid level at its established level, whereby the feed enters said fractionation zone at a predetermined temperature relative to its bubble point at the pressure prevailing in said region of feed introduction.

3. The process of claim 2 wherein said liquid level is controlled to maintain the vapor pressure in the control vessel slightly lower than the vapor pressure at the feed introduction region whereby said feed enters the fractionation zone substantially at its bubble point under the prevailing pressure.

4. The process of claim 2 wherein said liquid level is controlled to maintain the vapor pressure in the control vessel substantially lower than the vapor pressure at the feed introduction region whereby the feed enters said fractionation zone at a temperature substantially below its bubble point at the pervailing pressure.

5. The process of claim 2 wherein said liquid level is controlled to maintain the vapor pressure in the control vessel substantially higher than the vapor pressure at the region of feed introduction, whereby the feed enters said fractionation zone at a temperature substantially above its bubble point at the prevailing pressure.

6. The process of claim 2 wherein the feed is composed predominantly of hydrocarbons having 4 to 8 carbon atoms.

7. In a fractionation process, the steps which comprise passing a feed composed essentially of $C_4$ to $C_8$ hydrocarbons in indirect heat exchange with heated steam to heat said feed, passing the heated feed to a fractionation zone, supplying heat to the bottom of said fractionation zone and withdrawing heat from the top of said fractionation zone, withdrawing a heavy kettle product and a light overhead product from said fractionation zone, withdrawing a small proportion of the heated feed and introducing it into a control vessel wherein a liquid level is maintained, passing liquid from said vessel through a substantially unobstructed flow path to a region of said fractionation zone closely adjacent the region of feed introduction, passing vapors from said control vessel through a restricted flow path to a region of said fractionation zone substantially higher than the region of feed introduction, establishing a liquid level in said vessel which bears a predetermined relation to the liquid level at the feed introduction region of said fractionation zone, decreasing the amount of steam fed in indirect heat exchange with the feed when said liquid level falls below its established value, and increasing said flow of steam when said liquid level rises above the established value, whereby the feed entering said fractionation zone is maintained at a fixed temperature relative to its bubble point at the prevailing pressure within the fractionation zone.

8. In a fractionation system, in combination, a fractionation column, a heater at the bottom of said column, a condenser and reflux accumulator connected to said column at the top thereof, a feed preheater, a valve regulating the supply of a heating medium to said feed preheater, a control vessel positioned adjacent said fractionation column, a relatively large feed line connecting said feed preheater to said fractionation column at a selected level therein, a relatively small pipe connecting said feed line to said control vessel, a relatively large pipe connecting a low part of said vessel to said fractionation column at a region closely adjacent said feed line, a restricted bleed line connecting a high part of said vessel to said fractionation column at a level substantially higher than the level of feed introduction, a liquid level sensing device connected to said control vessel, and a liquid level controller actuated by said sensing device and connected to said regulating means so as to maintain a predetermined liquid level in said vessel through control of the heating medium supplied to said feed preheater.

9. In a fractionation system, in combination, a fractionation column having a series of vertically-spaced trays, certain of said trays having a liquid downcomer arranged diametrically of the column, a heater at the bottom of said column, a condenser and reflux accumulator connected to said column at the top thereof, a feed preheater, a valve regulating the supply of a heating medium to said feed preheater, a control vessel positioned adjacent said fractionation column, a relatively large feed line connecting said feed preheater to said fractionation column, a feed inlet pipe connected to said feed line and extending diametrically of the column directly above one of said downcomers, the bottom of said pipe being perforated to provide a uniform discharge of liquid into said downcomer, a relatively small pipe connecting said feed line to said control vessel, a relatively large pipe connecting a low part of said vessel to said fractionation column at a region closely adjacent said feed line, a restricted bleed line connecting a high part of said vessel to said fractionation column at a level substantially higher than the level of feed introduction, a liquid level sensing device connected to said control vessel, and a liquid level controller actuated by said sensing device and connected to said regulating means so as to maintain a predetermined liquid level in said vessel through control of the heating medium supplied to said feed preheater.

No references cited.